(12) United States Patent
Hötzeldt et al.

(10) Patent No.: US 7,837,007 B2
(45) Date of Patent: Nov. 23, 2010

(54) SOUND-ABSORBING ELEMENT FOR TRANSPORT MEANS, IN PARTICULAR FOR AIRCRAFT

(75) Inventors: Stephan Hötzeldt, Bremen (DE); Malte Becker, Bremen (DE); Bernd Ohlendorf, Bremen (DE); Steffen Erfurth, Bremen (DE)

(73) Assignee: Airbus Deutschland GmbH (DE)

( * ) Notice: Subject to any disclaimer, the term of this patent is extended or adjusted under 35 U.S.C. 154(b) by 80 days.

(21) Appl. No.: 11/990,861

(22) PCT Filed: Aug. 23, 2006

(86) PCT No.: PCT/EP2006/008291

§ 371 (c)(1),
(2), (4) Date: Feb. 21, 2008

(87) PCT Pub. No.: WO2007/022973

PCT Pub. Date: Mar. 1, 2007

(65) Prior Publication Data

US 2009/0133958 A1    May 28, 2009

(30) Foreign Application Priority Data

Aug. 23, 2005 (DE) .................. 10 2005 039 767

(51) Int. Cl.
*G10K 11/00* (2006.01)
*F16F 15/00* (2006.01)
*E04B 1/00* (2006.01)
*E04B 1/82* (2006.01)
*E04B 2/00* (2006.01)
*E04C 2/34* (2006.01)

(52) U.S. Cl. .................. 181/210; 181/194; 181/208; 181/291; 181/292; 52/272; 52/585.1; 52/791.1

(58) Field of Classification Search .................. 181/210, 181/194, 208, 291, 292; 52/272, 585.1, 791.1
See application file for complete search history.

(56) References Cited

U.S. PATENT DOCUMENTS 2,118,998 A * 5/1938 Alnutt .......................... 52/272
2,819,032 A * 1/1958 Detrie et al. ................. 244/119

(Continued)

FOREIGN PATENT DOCUMENTS

DE            9215618 U        3/1993

(Continued)

*Primary Examiner*—Jeffrey Donels
*Assistant Examiner*—Christina Russell
(74) *Attorney, Agent, or Firm*—Lerner, David, Littenberg, Krumholz & Mentlik, LLP

(57) ABSTRACT

A sound absorption element for means of transport, in particular for aircraft, comprising at least one sound absorption panel arranged on a base panel with the base panel comprising a multitude of recesses, in particular a hole grid or the like, for the transmission of sound.

According to the invention, the sound absorption panels are each framed by a frame, wherein on the at least one frame at least in some sections a transition profile, in particular to prevent fatigue fractures due to stepwise changes of rigidity between the at least one frame and the base panel is arranged.

Due to the base panel comprising a multitude of recesses, in particular comprising a hole grid, in connection with the sound absorption panels an air-permeable sound absorption element can be achieved.

14 Claims, 3 Drawing Sheets

U.S. PATENT DOCUMENTS

| | | | |
|---|---|---|---|
| 3,021,916 A * | 2/1962 | Kemp | 181/292 |
| 4,084,366 A * | 4/1978 | Saylor et al. | 52/791.1 |
| 4,416,349 A * | 11/1983 | Jacobs | 181/208 |
| 5,483,778 A * | 1/1996 | Scrivener | 52/579 |
| 5,768,845 A * | 6/1998 | Beaulieu et al. | 52/585.1 |
| 6,301,847 B1 * | 10/2001 | Beck et al. | 52/239 |
| 6,883,277 B2 * | 4/2005 | Wiechecki et al. | 52/36.6 |

FOREIGN PATENT DOCUMENTS

| | | |
|---|---|---|
| DE | 19846436 | 4/2000 |
| DE | 19916838 | 11/2000 |
| EP | 677429 | 10/1995 |
| EP | 1188547 | 3/2002 |
| FR | 2733262 A1 | 10/1996 |
| GB | 1172133 | 11/1969 |
| RU | 28098 U1 | 3/2003 |
| RU | 2211898 C1 | 9/2003 |
| SU | 183593 A1 | 1/1969 |
| WO | 8600658 | 1/1986 |

* cited by examiner

SOUND-ABSORBING ELEMENT FOR TRANSPORT MEANS, IN PARTICULAR FOR AIRCRAFT

FIELD OF THE INVENTION

The invention relates to a sound absorption element for means of transport, in particular for aircraft, comprising at least one sound absorption panel arranged on a base panel, wherein the base panel comprises a multitude of recesses, in particular a hole grid or the like, for the transmission of sound.

BACKGROUND OF THE INVENTION

For the purpose of sound absorption in aircraft interiors sandwich panels are used that comprise a honeycomb core as a core structure with cover layers on both sides. The honeycomb core is, for example, formed using Nomex® paper that is impregnated with phenolic resin, while the cover layers are made from a fibre-reinforced plastic material, in particular from a so-called prepreg material. The term "prepreg" material refers to woven reinforcement-fibre fabrics, interlaid reinforcement-fibre scrims or reinforcement fibres that have been pre-impregnated in the factory with a suitable resin system, for example an epoxy resin or the like, and that are subsequently cured at suitable temperatures and pressures without any further additives such as, for example, hardeners. The interlaid reinforcement-fibre scrim, the woven reinforcement-fibre fabric and the reinforcement fibres can, for example, comprise carbon fibres, glass fibres, aramide fibres or the like. However, such sandwich panels do not provide gas permeability to an extent worth mentioning.

Furthermore, sound absorption elements are known in which a layer of sound absorption material is arranged between perforated metal sheets or the like. The weight per unit of area of such structures is, as a rule, too heavy for applications in aircraft engineering.

SUMMARY OF THE INVENTION

It is the object of the invention to create a sound absorption element for absorbing the sound in aircraft interiors, which sound absorption element provides adequate gas permeability while at the same time being light in weight and durable.

The object according to the invention is met by a sound absorption element according to claim 1.

Because in each case the sound absorption panel or panels is/are framed by a frame, wherein on the at least one frame at least in some sections a transition profile, in particular to prevent fatigue fractures due to stepwise changes of rigidity between the at least one frame and the base panel, is arranged, the sound absorption element according to the invention is gas-permeable and has a light weight per unit of area while at the same time providing good mechanical rigidity. The transition profiles, which are provided according to the invention, between the base panel and the frame for framing the sound absorption panels within the sound absorption element, ensure that the sound absorption element according to the invention is substantially free of any fatigue, even over extended periods of operation.

According to an advantageous embodiment of the sound absorption element according to the invention, the at least one transition profile comprises a self-adhesive plastic material. The self-adhesive plastic material makes it possible to apply the transition profiles in a simple manner. At the same time good mechanical connection of the transition profiles between the frame segments and the base panel is achieved.

The transition profiles are, for example, formed with a two-component sealing compound as a plastic material, in particular based on a polysulphide polymer, polythioether polymer, vinylidenefluoride polymer, hexafluoropropylene polymer (FPM), polyurethane polymer or the like. The transition profiles can, for example, comprise a square, rectangular, concave, triangular or quarter-circle shaped cross-sectional geometry and can, for example, be in the form of so-called yard goods. By corresponding cutting to length, the required transition profiles that match the geometric dimensions of the frame can be formed from the yard goods. As an alternative, the transition profiles can, for example, also be formed using one of the above-mentioned plastic materials in the form of a knifing compound or a spraying compound.

According to a further advantageous embodiment of the sound absorption element, the frame or frames are each formed with four frame segments, wherein the frame segments are essentially connected to the base panel so as to abut and approximately at right angles to each other, in order to form an essentially rectangular frame, respectively.

Due to the simple, preferably rectangular, frame geometry the sound absorption element according to the invention can be produced simply and economically. In a preferred embodiment the frame segments are glued onto the base panel in order to form the frames. In an alternative embodiment variant of the sound absorption element the frame segments can also be firmly connected to the base panel by means of known welding methods.

A further advantageous embodiment of the invention provides for the at least one transition profile to be connected, at least in some sections, to at least one frame segment and to the base panel. Since the frame segments are glued to the base panel, the base panel can essentially, in the interior regions of the frames, be excited to oscillate as a result of the impinging sound energy. Because the material of the base panel is preferably thin, so-called stepwise changes of rigidity result in the transition region to the glued-on frame segments, in particular in the region of the interior surfaces of the frame segments, which stepwise changes of rigidity can lead to symptoms of fatigue, in particular fatigue fractures, in these regions, so that the transition profiles are arranged to effectively suppress fatigue fractures, in particular in the transition regions between the interior surfaces of the frame segments and the base panel.

According to a further advantageous embodiment, the frame segments comprise hollow profiles, in particular hollow rectangular profiles, for draining away water and extraneous particles. The use of hollow rectangular profiles makes it possible to effectively provide rigidity to the base panel, while at the same time ensuring ease of manufacture. Furthermore, hollow rectangular profiles provide good mechanical strength with light weight. Moreover, dirt particles or water that has entered can easily drain away through the hollow rectangular profiles.

A further advantageous embodiment provides for a connecting strap to be applied, in each case, to the frame segments in the corner regions of the frames so as to provide mechanical stiffening. Applying connecting straps in the corner regions of the frame segments that have been glued onto the base panel provides effective mechanical stiffening to the frames formed by the frame segments. In this arrangement, depending on the number of frame segments that adjoin in the corner regions, the connecting straps may be angle-shaped, T-shaped or cross-shaped. The connecting straps can be glued on, or they can be firmly connected to the frame segments with the use of known welding methods.

According to a further advantageous embodiment, starting from the diagonally opposite corner regions of the at least one frame in each case a retention strap extends for affixing the sound absorption panel, of which there is at least one, to the base panel.

The retention straps that are arranged diagonally and crossed, make it possible to securely affix the sound absorption panels in the frames. The retention straps can be attached in the corner regions of the frames by means of clamp-type connectors. As an alternative to this, the retention straps can also be glued to or welded to the corner regions of the frames.

BRIEF DESCRIPTION OF THE DRAWINGS

Further advantageous embodiments of the sound absorption element according to the invention are disclosed in the further patent claims.

The following are shown in the drawing.

Identical construction elements in the drawings have the same reference characters.

DETAILED DESCRIPTION OF EMBODIMENTS OF THE INVENTION

Figure 1:
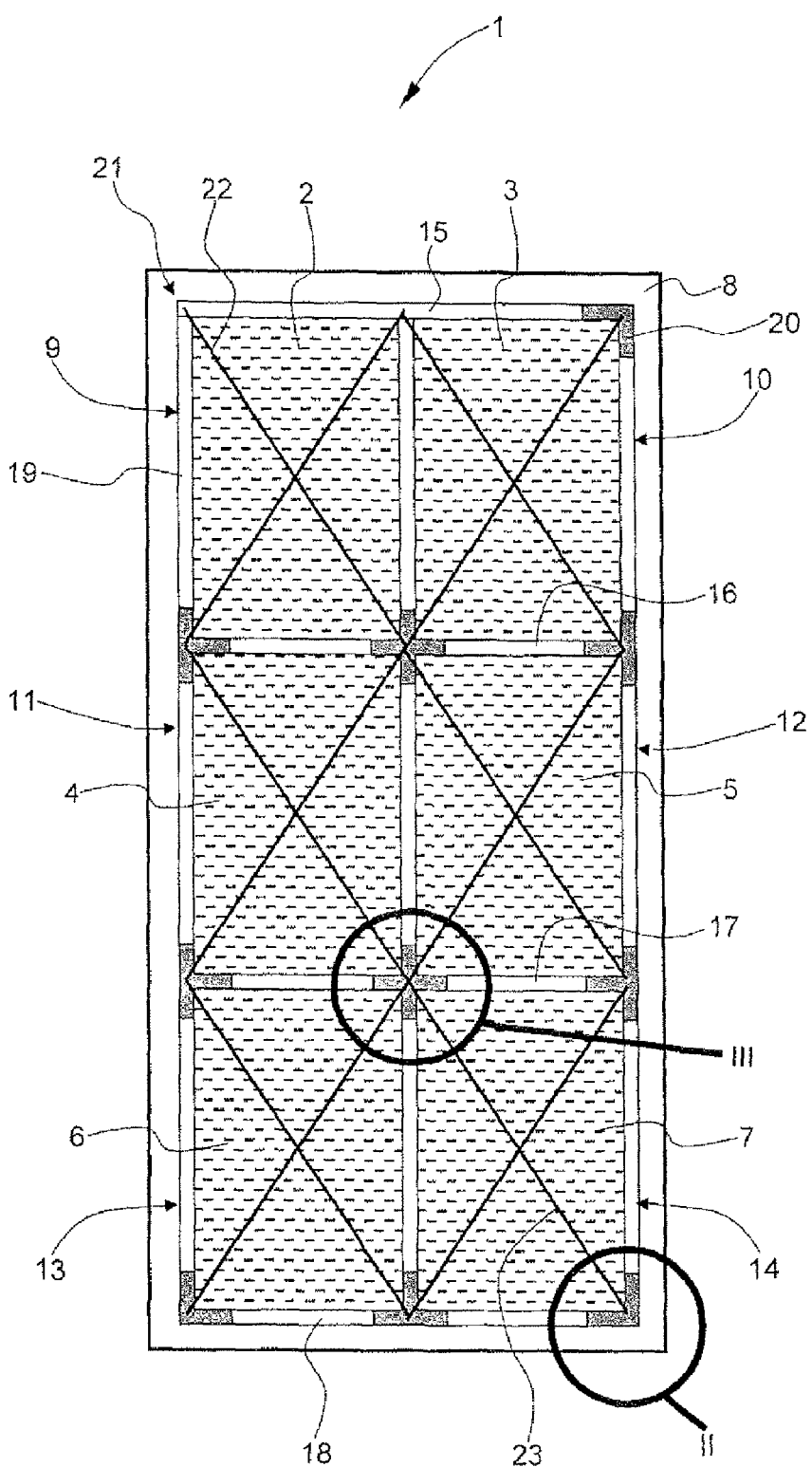
FIG. 1 a rear view of a sound absorption element according to the invention.

FIG. 1 shows a rear view of the sound absorption element according to the invention.

In the exemplary embodiment shown the sound absorption element 1 comprises six sound absorption panels 2 to 7. Six essentially rectangular frames 9 to 14 are glued onto a base panel 8. The frames 9 to 14 are, in particular, used to accommodate the sound absorption panels 2 to 7.

The rectangular frames 9 to 14 comprise four horizontal frame segments 15 to 18 as well as a total of nine vertical frame segments, of which for the sake of clarity only a first frame segment 19, which is representative of the remaining frame segments, has a reference character. The frame segments preferably comprise hollow rectangular profiles in order to make it possible for water and extraneous particles to drain away. As an alternative, the frame segments can also comprise other profile shapes, for example square hollow profiles or the like. In each case connecting straps are glued onto the corner regions of the frames 9 to 14 to provide mechanical stiffening to the frames 9 to 14, of which connecting straps for the sake of clarity only one connecting strap 20, which is representative of the remaining connecting straps, has a reference character. The connecting strap 20 is angle-shaped with two limbs that are arranged at right angles to each other, because in this region two frame segments abut. Depending on the number (three or four) of the adjoining frame segments, other connecting straps may be T-shaped or cross-shaped. In corner regions of the frames 9 to 14 the frame segments adjoin essentially at right angles, wherein again for the sake of clarity only the corner region 21 has a reference number. In the corner region 21 a connecting strap is also provided, which for the sake of clarity relating to the adjoining frame segments 15, 19 and of the retention strap 22 is not shown in the drawing.

In each case two opposite corner regions of a frame 9 to 14 comprise retention straps, of which only the retention straps 22, 23 have reference characters. In total, the retention straps secure the sound absorption panels 2 to 7 in the frames 9 to 14.

Figure 2:
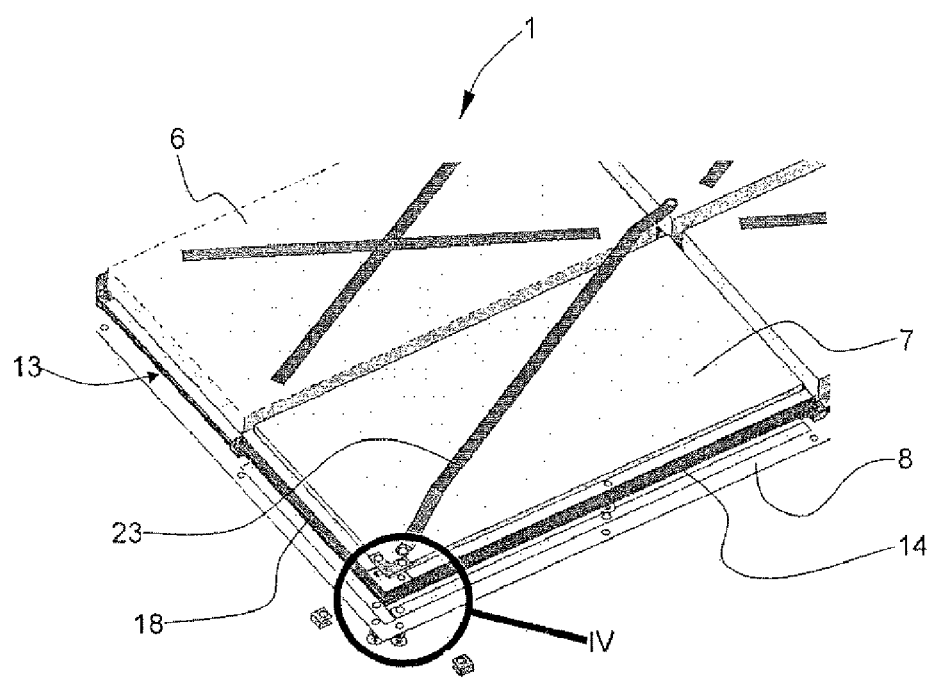
FIG. 2 a perspective view of area II in FIG. 1.

FIG. 2 shows a perspective partial view of the sound absorption element 1 shown in FIG. 1.

The sound absorption panels 6, 7 are framed by, among other things, the frames 13 and 14. As shown in FIG. 2, the retention strap 23 is designed so as to be slightly angled at both end regions. This design largely prevents any undesired pressing-down onto the sound absorption panels in the end regions of the retention straps.

Furthermore, in both end regions of the retention strap 23 boreholes are provided for fastening the retention strap 23 to the frame 14 or to the base panel 8.

Figure 3:
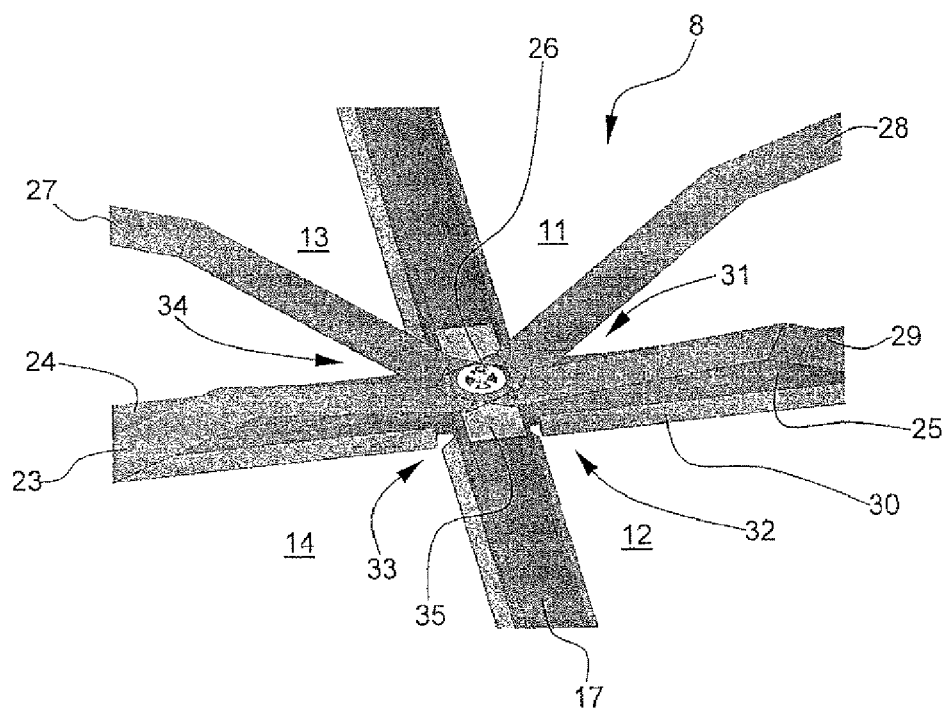
FIG. 3 an enlarged perspective view of area III in FIG. 2.

FIG. 3 shows an enlarged view of area III in FIG. 2, wherein in this region the frames 11, 12, 13, 14 with the frame segment 17 as well as the frame segments 24, 25 adjoin. The sound absorption panels 4, 5, 6, 7 are not shown so that the base panel 8 below said sound absorption panels 4, 5, 6, 7 is visible. By means of a clamp-type connector 26 as a connecting means, the retention strap 23 and the further retention straps 27 to 29 are connected to the frame segment 17 glued onto the base panel 8. In each case a transition profile 30 is arranged on the frame segments 17, 24, 25, in other words said transition profile 30 is glued to the base panel 8 and to the respective frame segment. Only one transition profile 30, which is representative of the remaining transition profiles, comprises a reference character. In the embodiment shown the transition profile 30 comprises an essentially triangular cross-sectional geometry so that a limb surface of the transition profile 30 rests against the respective frame segment while the other limb surface rests against the base panel 8 or is glued to this base panel 8. In this arrangement the transition profile 30 or the further transition profiles comprises/comprise an elastic self-adhesive plastic material. The transition profiles comprise, for example, a two-component sealing compound, in particular based on a polysulphide polymer, polythioether polymer, vinylidenefluoride polymer, hexafluoropropylene polymer (FPM), polyurethane polymer or the like. As an alternative, the transition profiles can, for example, also be formed using one of the above-mentioned plastic materials in the form of a knifing compound or a spraying compound.

In the four corner regions 31 to 34 the transition profiles are not mitre cut so that small square areas of the base panel 8 are not covered by the transition profiles or the transition profile 30, and so that water and extraneous particles can drain away. A glued-on connection strap 35 has a cross shape in order to interconnect the through-frame segment 17 and the two frame segments 24, 25 that adjoin the former at a right angle to the base panel 8 in addition to the adhesive connection.

Figure 4:
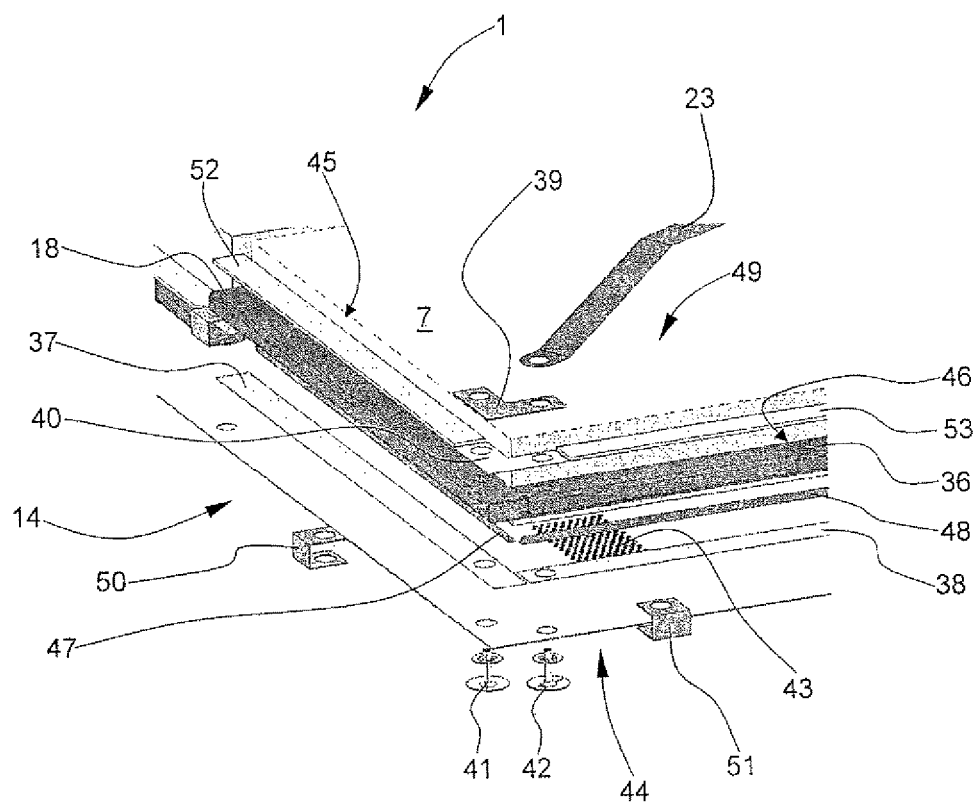
FIG. 4 an enlarged exploded view of area IV in FIG. 2.

FIG. 4 shows an enlarged exploded view of area IV in FIG. 2. The sound absorption panel 7 is framed by the frame segment 18 and by a frame segment 36. The frame segments 18, 36 are glued onto the base panel 8 by means of the adhesive layers 37, 38. The retention strap 23 is shown above the sound absorption panel 7. Moreover, the frame segments 18, 36 are interconnected by means of the glued-on connecting strap 39 in order to increase the mechanical strength. In this process the connecting strip 39 is glued on by means of the adhesive layer 40. In order to improve the strength of the mechanical connection between the base panel 8, the frame segments 18, 36, the connecting strap 39 and the retention strap 23, and in order to provide an additional load path in the case of failure of the adhesive connection the end regions of the above-mentioned components comprise two holes through which the two clamp-type connectors 41, 42 can be fed and fastened as connecting means. The clamp-type connectors 41, 42 preferably support installation without the use of tools. For the sake of clarity, the holes in the above-mentioned components have no reference characters.

At least underneath the sound absorption panel 7 the base panel 8 comprises a hole grid 43 which is essentially used to transmit the sound from sound waves impinging on the front 44 of the sound absorption element 1 according to the invention to the sound absorption panels 7. Furthermore, in the region of the interior edges 45, 46 of the frame segments 18, 36 self-adhesive transition profiles 47, 48 are arranged, which comprise for example a triangular cross-sectional geometry. As an alternative, the transition profiles, 47, 48 can also comprise a square, rectangular, concave or quarter-circle shaped cross-sectional geometry. Due to their self-adhesive characteristics the transition profiles 47, 48 are firmly connected both to the interior edges 45, 46 and to the base panel 8, or are securely glued to the latter. The transition profiles 47, 48 are in particular used to reduce the danger of material fatigue occurring in the region of the stepwise change of rigidity that results between the interior region 49 of the frame 14 or of the sound absorption panel 7 and the frame segments 18, 36 of the frame 14. Due to its thin material thickness, the interior region 49 of the base panel 8 tends to mechanical oscillation as a result of the impinging sound waves, while in the region of the frame segments 18, 36 oscillation excitation worth mentioning, of the base panel 8, is hardly possible, due to the high mechanical rigidity of the frame 7 and of the base panel 8 connected to said frame 7, so that in the region of this stepwise change of rigidity fatigue fractures would be likely to occur if it were not for the transition profiles 47, 48.

Furthermore, two clips 50, 51, which preferably are electrically conductive, are provided, which also comprise a hole, and which serve to establish electrically conductive connections between the frame segments 18, 36 and the base panel 8. The clips 50, 51 are connected to the clamp-type connectors 41, 42, the frame segments 18, 36, the base panel 8, the connecting strap 39 and the retention strap 23.

Furthermore, sealing means 52, 53, for example in the form of flat elastic seals or the like, are arranged on the frame segments. The sealing means 52, 53 make possible a largely smoke-proof, gas-proof and pressure-proof connection of the sound absorption element 1 to further construction elements (not shown in detail).

Figure 5:
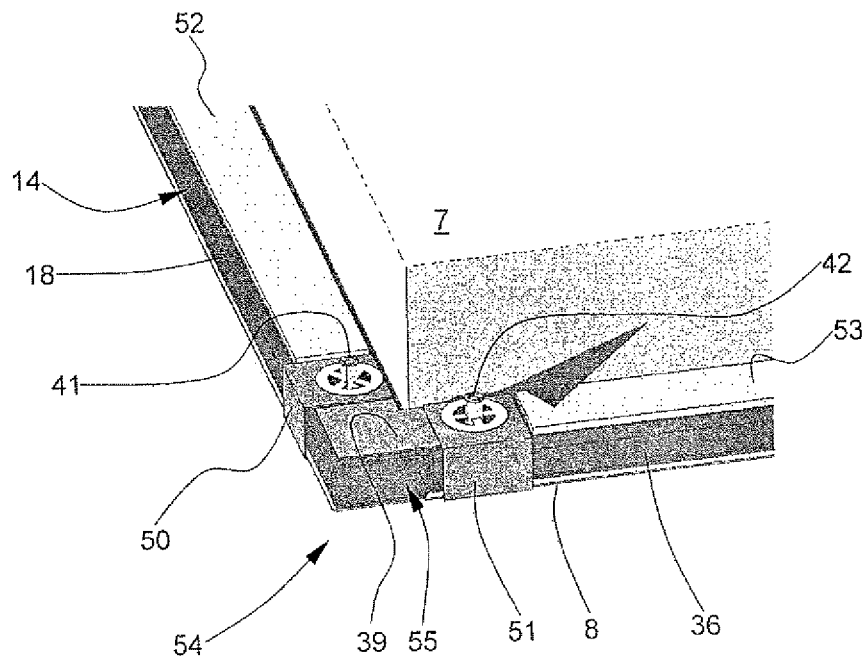
FIG. 5 a perspective view of a corner region of the completely installed sound absorption element.

FIG. 5 shows the corner region of the sound absorption element 1, of FIG. 4, according to the invention in its completely installed state.

The sound absorption panel 7 is framed by the frame segment 18 and the frame segment 36. In a corner region 54 the frame segment 18 and the frame segment 36, which in the exemplary embodiment shown are formed with the use of hollow rectangular profiles, are interconnected so as to abut at an angle of approximately 90°. In this arrangement the frame segments 18, 36 are glued onto the base panel 8, and in addition in a corner region 54 they are connected by means of the glued-on angle-shaped connecting strap 39. In the corner region 54 the connecting strap 39, the frame segments 18, 36 and the base panel 8 are enclosed by the clips 50, 51 in order to establish an electrically conductive connection between the frame segments 18, 36 and the base panel 8. In this arrangement the base panel 8, the frame segments 18, 36, the connecting strap 39 as well as the two clips 50, 51 are in addition mechanically connected by means of the clamp-type connectors 41, 42. Furthermore, the sealing means 52, 53 have been applied to the frame segments 18, 36.

Due to the fact that the frame segments 18, 36 of the frame 14, which frame segments 18, 36 comprise rectangular profiles, are only connected so as to abut at right angles in the corner region 54, extraneous particles, for example grains of sand or water, that have found their way in can exit through an opening 55 in the frame segment 18. Thus all the frames that are used to enclose or mechanically fasten the sound absorption panels of the sound absorption element 1 are able to drain and are thus, for example, protected from corrosion processes as a result of moisture that cannot drain away.

The base panel, the frame segments and the connecting straps can comprise either metallic materials or plastic materials. Depending on the materials used, connecting the frame segments to the base panel, or connecting the frame segments to the connecting straps, can take place by any desired adhesive methods, soldering methods or welding methods, in particular by spot welding, ultrasonic welding, laser welding or the like.

For example aluminium, aluminium alloys, steel, steel alloys, stainless steel, titanium or titanium alloys can be used as metallic materials for the frame segments, the base panel and the connecting straps. As an alternative, the frame segments, the base panel and the connecting straps can also be formed with the use of previously impregnated "prepreg" material, in particular with carbon-fibre reinforced epoxy resins or the like. Furthermore, polyester resins, phenolic resins and BMI resins can be considered as non-metallic materials, in each case with fibre reinforcement comprising glass fibres, carbon fibres, aramide fibres or the like.

If the frame segments, the base panel and the connecting straps are at least in part made from a metallic material, and in this case are, for example, interconnected by means of a weld connection or solder connection, there is no need to provide clips in order to establish a conductive connection.

The sound absorption panels can comprise any desired sound-absorbent materials, for example mineral wool, plastic foam, glass wool, knitted fibre materials or the like.

LIST OF REFERENCE CHARACTERS

1 Sound absorption element
2 Sound absorption panel
3 Sound absorption panel
4 Sound absorption panel
5 Sound absorption panel
6 Sound absorption panel
7 Sound absorption panel
8 Base panel
9 Frame
10 Frame
11 Frame
12 Frame
13 Frame
14 Frame
15 Frame segment (horizontal)
16 Frame segment (horizontal)
17 Frame segment (horizontal)
18 Frame segment (horizontal)
19 Frame segment (vertical)
20 Connecting strap
21 Corner region
22 Retention strap
23 Retention strap
24 Frame segment
25 Frame segment
26 Clamp-type connector
27 Retention strap
28 Retention strap
29 Retention strap
30 Transition profile 31 Corner region
32 Corner region
33 Corner region
34 Corner region
35 Connecting strap
36 Frame segment
37 Adhesive layer
38 Adhesive layer
39 Connecting strap
40 Adhesive layer
41 Clamp-type connector
42 Clamp-type connector
43 Hole grid
44 Front
45 Interior edge
46 Interior edge
47 Transition profile
48 Transition profile
49 Interior region (frame)
50 Clip
51 Clip
52 Sealing means
53 Sealing means
54 Corner region
55 Opening

The invention claimed is:

1. A sound absorption element for means of transport, in particular for aircraft, comprising:
a base panel, and
at least one sound absorption panel arranged on the base panel,
wherein the base panel comprises a multitude of recesses, in particular a hole grid or the like, in a region underneath the absorption panel for the transmission of sound;
the at least one sound absorption panel being framed by a frame, and
wherein an elastic transition profile is provided between the frame and the base panel on at least some sections of the frame in order to, upon occurrence of mechanical vibrations resulting from impinging sound waves, prevent fatigue fractures due to stepwise changes of rigidity.

2. The sound absorption element of claim 1, wherein the elastic transition profile comprises a self-adhesive plastic material.

3. The sound absorption element of claim 1, wherein the frame is formed with four frame segments, wherein the four frame segments are connected to the base panel so as to abut, approximately at right angles to each other, in order to form an essentially rectangular frame.

4. The sound absorption element of claim 1,
wherein the frame is formed with at least one frame segment, and
wherein the elastic transition profile is connected, at least in some sections, to at least one frame segment and to the base panel.

5. The sound absorption element of claim 1, further comprising frame segments having hollow profiles in order to make it possible for water and extraneous particles to drain away.

6. The sound absorption element of claim 5, wherein the hollow profile is a rectangular hollow profile.

7. The sound absorption element of claim 1, wherein a connecting strap is applied to frame segments in corner regions of the frames to provide mechanical stiffening.

8. The sound absorption element of claim 1,
wherein the frame comprises diagonally opposite corner regions,
wherein a retention strap extends for affixing the at least one sound absorption panel to the base panel, the retention strap starting from the diagonally opposite corner regions of the frame.

9. The sound absorption element of claim 8,
wherein the retention strap in the corner regions of the frame is connected to the base panel using connecting means such as clamp-type connectors or the like.

10. The sound absorption element of claim 1, wherein a flat seal sealing means is mounted on at least some sections of a frame segment.

11. The sound absorption element of claim 1, wherein at least one clip is arranged so as to provide a conductive connection between a frame segment and the base panel.

12. The sound absorption element of claim 1, wherein the at least one sound absorption panel comprises a sound-absorbent material.

13. The sound absorption element of claim 12, wherein the sound-absorbent material is selected from a group consisting of plastic foam, glass wool, mineral wool or the like.

14. The sound absorption element of claim 1,
wherein the frame is formed with at least one frame segment, and
wherein at least one of the base panel and the at least one frame segment comprises at least one of a metallic material and a plastic material.

* * * * *